Feb. 27, 1951            L. M. WARFEL            2,543,682
PASTRY PATTER
Original Filed May 22, 1940
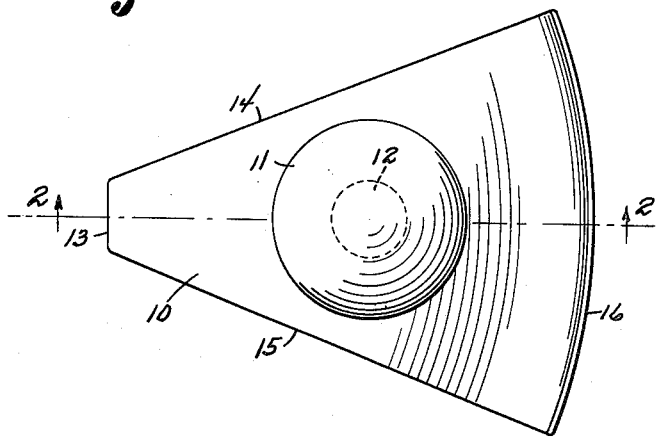
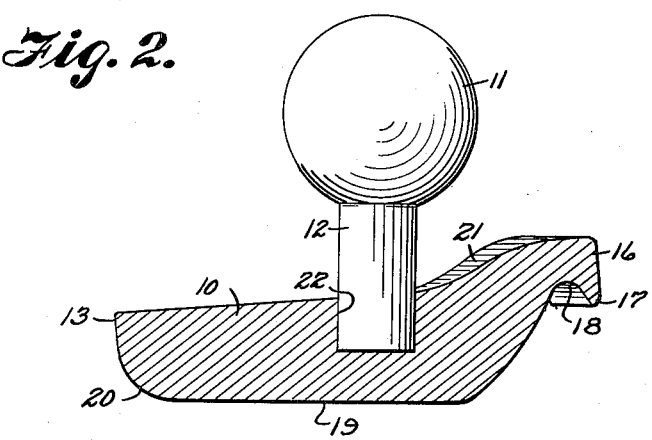
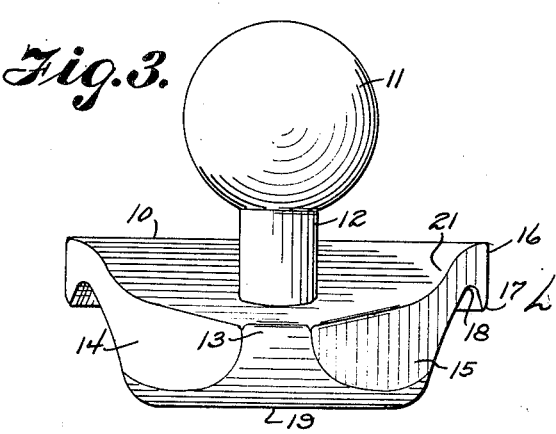
INVENTOR.
Lorena May Warfel
James Harrison Bowen
ATTORNEY Patented Feb. 27, 1951

2,543,682

UNITED STATES PATENT OFFICE 2,543,682
PASTRY PATTER
Lorena May Warfel, Los Angeles, Calif.
Substituted for abandoned application Serial No. 336,554, May 22, 1940. This application filed January 14, 1948, Serial No. 2,211

1 Claim. (Cl. 107—47)

This invention relates to pastry forming devices and particularly devices for working pie crust into proper form in pie plates or tins, and in particular a substantially triangular-shaped block with a knob by which it may be held by hand to pat or work dough from a ball in a pie pan to the form of the crust of a pie.

The purpose of this invention is to provide means for working dough for pie crusts into the proper shape without rolling or subjecting the dough to unnecessary working.

It is commonly known that handling dough for pie crusts or rolling the dough with a roller toughens the crust, and although various types of machines have been provided for forming crust for pies with male and female dies, it has been found desirable, particularly for domestic use to provide means for shaping the dough with very little handling. With this thought in mind this invention contemplates a pastry patter by which the dough is worked by patting so that it extends over the pie pan and assumes the usual form.

The object of this invention is to provide means for making a dough patting device so that it may be held in one hand and used to form the crust over the flat part of the pan and also up the inclined edge and over the rim.

This application is substituted for my prior application filed the 22nd day of May, 1940, with the Serial Number 336,554, now abandoned.

Another object of the invention is to provide a pastry patter that may be used with pie pans or plates of different sizes.

A further object of the invention is to provide a pastry patter particularly for domestic use which is of a simple and economical construction.

With these and other objects and advantages in view the invention consists of the new and novel combination, construction, and arrangement of parts as hereinafter more fully described, set forth in the claim appended hereto, and disclosed in the accompanying drawings, forming part hereof, wherein:

Figure 1 is a plan view of the pastry patter.

Figure 2 is a cross section through the block of the patter taken on line 2—2 of Figure 1 with the knob and stem shown in elevation.

Figure 3 is a view showing a front elevation of the patter looking toward the point thereof.

Referring now to the drawings wherein like reference characters indicate corresponding parts the pastry patter of this invention is formed with a block 10, a knob 11, and a stem 12 by which the knob is mounted on the block.

The block 10, as shown in Figure 1, is substantially triangular-shaped with a small flat end 13 and outwardly extending sides 14 and 15 with an arcuate outer end 16. The outer end 16 is formed with a lip 17 having an under-cut or recess 18 behind the lip, and from the recess the under surface of the block curves downwardly and inwardly blending into a flat lower surface 19. The block is also provided with an arcuate surface 20 below the end 13 that blends into the surface 19, as shown in Figure 2. The upper surface 21 of the block extends upward toward the outer end 16 increasing the thickness thereof over the recess 18.

The knob 11 may be made round as shown, or may be provided of any suitable shape, and in the design shown the knob is provided with a stem 12 that is held in an opening 22 in the upper surface of the block.

With the elements arranged in this manner a ball of dough may be placed in a pie pan and with the patter held by the knob 11 it may be used to pat the dough whereby the dough may be readily worked outward to cover the pan and as it extends over the rim it may be shaped by the lip and recess at the outer end of the block. By this means the pie crust is formed without rolling and with very little handling.

It will be understood that modifications may be made in the design and arrangement of the parts without departing from the spirit of the invention.

What is claimed is:

In a pastry patter for smoothing out dough in a pie plate or the like, the combination which comprises a block having a base with outwardly diverging sides extended from the ends of the base and having an arcuate outer surface with an overhanging lip on the upper edge, connecting the ends of the outwardly diverging sides, said block having a horizontally disposed bottom with an arcuate surface connecting the bottom to the base and with an upwardly sloping surface merging with the outer edge of the bottom and extending to a recess under the said lip, the said lip being spaced from the bottom of the block a distance corresponding to the height of a pie tin, a vertically disposed stem mounted on the upper surface of the block and positioned midway between the arcuate outer surface and base, and a knob on the upper end of the said stem providing a handle.

LORENA MAY WARFEL.

REFERENCES CITED

The following references are of record in the file of this patent:

UNITED STATES PATENTS

| Number | Name | Date |
|---|---|---|
| 360,753 | Bailey | Apr. 5, 1887 |
| 1,527,671 | Condyles | Feb. 24, 1925 |
| 1,926,548 | Mears | Sept. 12, 1933 |

FOREIGN PATENTS

| Number | Country | Date |
|---|---|---|
| 12,686 | Great Britain | May 25, 1910 |
| 385,035 | Great Britain | Dec. 22, 1932 |